Patented May 19, 1936

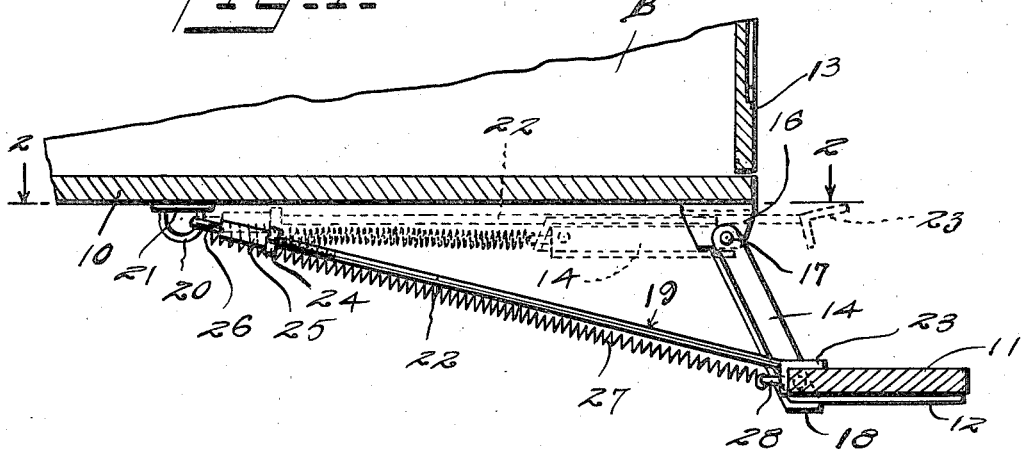
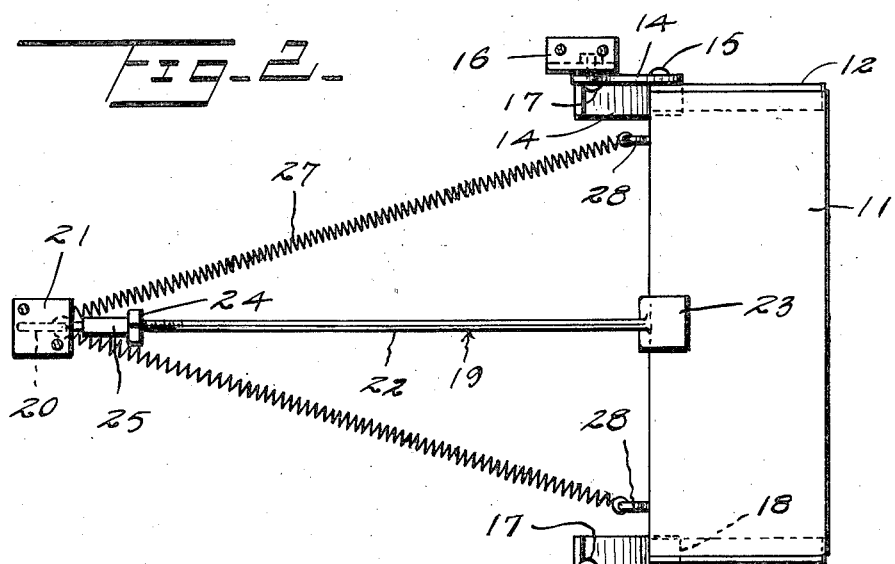
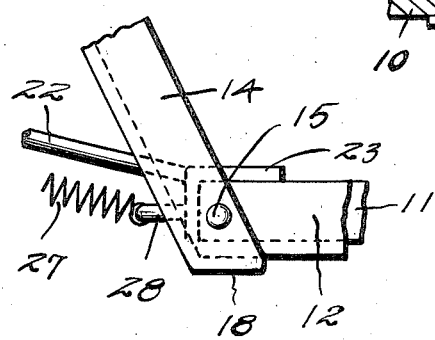
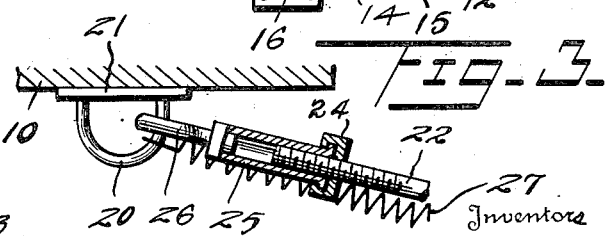

2,041,640

UNITED STATES PATENT OFFICE 2,041,640

FOLDING STEP FOR VEHICLES

James H. Goss and Johnson D. Snyder, Lewistown, Pa.

Application December 5, 1935, Serial No. 53,067

4 Claims. (Cl. 280—166)

This invention relates to folding steps and more particularly to an improved type of step for use with vehicles, particularly vehicles having a substantially closed body such as trailers or the like.

An object of this invention is to provide a folding step which can be readily moved to operative position and which, when in folded position, will be disposed beneath the bottom of the vehicle body so that the step will be out of the way.

Another object of this invention is to provide in a step of this kind yieldable means in combination with a brace which may be of an adjustable type so as to hold the step in operative position.

The above and various other objects and advantages of this invention will in part be described in, and in part be understood from the following detail description of the present preferred embodiment, the same being illustrated in the accompanying drawing, wherein:—

Figure 1 is a longitudinal section partly in detail of a device constructed according to an embodiment of this invention mounted on a vehicle body which is shown in fragmentary sectional form.

Figure 2 is a sectional view partly in detail taken on the line 2—2 of Figure 1.

Figure 3 is an enlarged fragmentary longitudinal section similar to Figure 1.

Figure 4 is a fragmentary side elevation of the device.

Referring to the drawing wherein like symbols designate corresponding parts throughout the several views, the letter B designates generally a body such as a vehicle body of a suitable conveyance which may be either a trailer body or the like, of conventional construction, which has a floor or bottom 10 and a door 13 in a wall of the body B.

In order to provide a folding step beneath the door 13, we have provided a tread member 11 which may be substantially rectangular in plan and constructed of suitable material such as wood or the like, which may be provided at opposite ends thereof with angle irons 12 so as to reinforce the tread or step member 11 and prevent warping thereof. A pair of links 14 are secured one to each end of the step comprising the tread 11 and the angle members 12 by means of pivotal members 15 and these links 14 may be in the form of angle irons or other suitable supporting means which, at their upper ends, are pivotally secured to L-shaped attaching member 16. The upper ends of the links 14 are secured to the bearings or attaching members 16 by means of pivotal members 17 in the form of bolts, rivets or other suitable pivotal means. Preferably, the lower ends of the swingable supporting members or links 14 are provided with inturned end portions 18 which are adapted to engage beneath the step adjacent the rear thereof so as to prevent swinging of the step comprising the tread 11 and the reinforcing members 12 to a position substantially beyond the horizontal.

The step hereinbefore described is held in operative position by means of a bracing member, generally designated as 19, and this bracing member 19 is swingably secured to a loop or eye 20, having a plate 21, which is secured to the underside of the bottom or floor 10. The bracing member 19 comprises a rod member 22 which may be either solid or hollow and is provided at its outer end with an L-shaped step engaging member 23, which is adapted to engage against the rear edge and the upper side of the tread 11 in substantially the longitudinal center of this member 11.

The inner end portion of the rigid bracing member 22 is provided with threads which are engaged by a swiveled nut 24 carried by a hollow or tubular member 25. This member 25 has an eye 26 secured to the inner end thereof which loosely engages the loop 20 carried by the base plate 21. The length of the bracing member 19 may be adjusted through the medium of the swiveled nut 24 so that the tread 11 may be held in the desired position with respect to the body B and to the door 13 when this step is in operative position.

In order to hold the tread 11 in contacting relation with the L-shaped outer end 23 of the bracing member 19, we have provided a pair of contractile springs 27 which have their forward ends secured to eyes 28 carried by the rear edge of the tread 11, there being two eyes 28, one adjacent each end of the tread 11 with the eyes 28 inwardly of the links or supporting members 14. The springs 27 are disposed in rearwardly convergent relation and have their rear ends looped about the loop 20 so that the tread 11, when in operative position, will be held tightly against the forward end of the bracing member 19.

In the use and operation of this folding step, the step when in folded position, will be as shown in dotted lines in Figure 1, with the bracing member 19 disposed between the tread 11 and the floor or bottom 10 of the vehicle body B. The springs 27 will hold the step in its folded position and when it is desired to swing the step comprising the tread 11 and the reinforcing members 12 to operative position, the tread 11 is pulled forwardly, which movement will swing the links 14 downwardly.

The inturned end portions 18 of the links 14 will prevent swinging of the tread 11 beyond a substantially horizontal position and when the tread 11 has been pulled outwardly a sufficient distance, the L-shaped end portion 23 of the bracing member 19 is engaged with the rear portion of the tread 11 with one leg of this member 23 engaging against the rear edge of the tread 11 and the other leg of this member 23 engaging the upper side of the tread 11. The contractile springs 27 will yieldably hold the tread 11 in contacting relation with the bracing member 19.

The length of the bracing member 19 may be adjusted by means of the swiveled nut 24 so that the brace attaching member comprising the plate 21 and the loop may be secured to the bottom of the floor 10 at any convenient location. It will, of course be understood that when the operative position of the step has been determined, the length of the bracing member 19 will not be varied.

We claim:—

1. A folding step for a vehicle comprising a step member, a pair of links pivotally secured at one end to the step member adjacent the rear thereof, there being one link adjacent each end of the step member, means carried by the step member to limit the swinging movement of the step member relative to the links, means engaging the other ends of the links to pivotally secure the links to a support, a bracing member, means for swingably securing one end of the bracing member to the support, a step engaging means carried by the other end of the bracing member to detachably secure the bracing member to the step member and yieldable means constantly urging the step member to contacting relation with said means carried by the bracing member.

2. A folding step for a vehicle body comprising a step member, means for swingably securing the step member to the vehicle body, means carried by said securing means to limit the swinging movement of the step member relative to the securing means, a bracing member, mounting means engaging one end of the bracing member to swingably mount the bracing member on the vehicle body, a step engaging means carried by the other end of the bracing member and engageable with the rear portion of the step member to hold the step member in operative position and yieldable means secured to the step member and to the mounting means for the brace to yieldably maintain the step member in contact with the step engaging means carried by the bracing member.

3. A folding step for a vehicle body comprising a step member, means for swingably securing the step member to the vehicle body, means for pivotally securing the step member to said first means, stop means carried by said securing means and engaging the step member to hold the step member in a horizontal operative position, a bracing member, mounting means engaging one end of the bracing member to swingably secure the bracing member to the vehicle body, an L-shaped step engaging member carried by the bracing member and engageable with the rear portion of the step member to hold the step member in operative position and yieldable means engaging the step member and the brace mounting means to yieldably maintain the step member in contacting relation with the L-shaped step engaging member, said yieldable means also yieldably maintaining the step member in folded position beneath the vehicle body.

4. A folding step for a vehicle body comprising a step member, means for swingably mounting the member on the body for movement from an inoperative position beneath the body to an operative position outwardly of the body, a longitudinally adjustable bracing member, an L-shaped step engaging member carried by one end of the bracing member, a brace mounting means including a looped bar secured to the body of the vehicle, an eye carried by the other end of the bracing member engaging said looped mounting means to swingably mount the bracing member on the body and yieldable means engaging said looped mounting means and the rear portion of the step member to yieldably hold the step member in contacting relation with the first named end of the bracing member.

JAMES H. GOSS.
JOHNSON D. SNYDER.